United States Patent Office

2,794,006
Patented May 28, 1957

2,794,006

PAN PROCESS OF RECLAIMING RUBBER

Edward A. Naudain, Newark, Del., and Clyde H. Boys, Drexel Hill, Pa., assignors to Hercules Powder Company, Wilmington, Del., a corporation of Delaware No Drawing. Application January 10, 1955,
Serial No. 480,993

6 Claims. (Cl. 260—2.3)

This invention relates to the reclamation of rubber and is concerned more particularly with a novel method by which vulcanized rubber waste or scrap, including that containing fibrous material, can be readily converted to a form suitable for processing and compounding treatments and for revulcanization.

The art of reclaiming natural and synthetic rubber is well established, although improved processes and new reclaiming aids are keeping the art in a constant state of modification and change. For many years, reclaimed rubber has provided a valuable source of material for replacing, extending, supplementing or complementing raw rubber supplies. It is well recognized, however, by the rubber industry that the ordinary swelling and softening agents used in reclaiming scrap rubber are not by themselves entirely suitable for softening and plasticizing vulcanized scrap sufficiently to allow its reuse in rubber compounding. It has been attempted to overcome the deficiencies in this respect by the addition of chemical reclaiming agents prior to or during the reclaiming operation.

There are several recognized and established methods of reclaiming, including those known as the alkali process, the acid process, the mechanical process, the zinc chloride process and the pan, or open steam, process.

The present invention is specifically concerned with an improvement in the pan process of reclaiming rubber. The process is described, for example, by Ball, "Reclaimed Rubber," New York (1947) and is characterized generally by the charging of ground or pulverized scrap rubber together with reclaiming aids into pans, placing the pans into a reclaiming vessel and introducing live steam under pressure into the reclaiming vessel until the temperature is raised to within the range of about 400° F. to 450° F. The reclaiming operation normally requires several hours (depending on the temperature used) for completion following which the steam is shut off, and the resultant cakes of fused "shoddy" are milled, strained and sheeted to slab form.

The pan process can be applied with fair success to both natural rubber scrap and some types of synthetic rubber scrap which may contain admixed therewith minor amounts of cellulosic material such as cotton and rayon. When cellulosic material is present, controlled amounts of water are often added to assist in hydrolyzing the cellulose.

In accordance with the present invention, it has been found that in the pan process of reclaiming rubber many advantages are obtained by adding to the charge a minor amount of a substantially petroleum hydrocarbon-insoluble pine wood resin. More specifically, benefits are obtained when the amount of substantially petroleum hydrocarbon-insoluble pine wood resin is from 1 to 49% by weight of the rubber scrap and optimum results are obtained with about 15 to 30% pine wood resin.

The resin may be used as such or in any of the several equivalent modified forms such as in the form of a formaldehyde-modified petroleum hydrocarbon-insoluble pine wood resin or a lime-modified petroleum hydrocarbon-insoluble pine wood resin. The modification of the resin can be effected, for example, by reaction with about 0.25 to 10% formaldehyde (or a compound engendering formaldehyde, such as hexamethylenetetramine) or about 0.25 to 4% lime prior to the introduction of the resin into the reclaiming process, or the resin can be modified in situ by the addition of the formaldehyde (in the form of hexamethylenetetramine) or lime to the charge to the reclaiming vessel.

The addition of the substantially petroleum hydrocarbon-insoluble pine wood resin in the process has been found to give numerous benefits. Specifically, the resin imparts greater hardness and often greater rigidity to both the reclaimed rubber and cured articles produced therefrom. These are desirable properties for many purposes. More important in some applications, however, is the fact that the incorporation of the resin facilitates further processing of the reclaimed rubber which speeds production and which enables the production of articles having a more attractive appearance. For example, the process of the invention leads to reclaimed rubber that can be extruded faster and smoother in subsequent processing thereby resulting in finished articles having relatively smooth and attractive surfaces. The reclaimed rubber produced according to the invention also exhibits greater flow in moldnig processes.

In order to illustrate the invention in more detail, the following examples are presented in which parts and percentages are by weight unless otherwise specified.

EXAMPLE 1

There was mixed together 64 parts of ground whole tire scrap, the rubber content of which comprised a mixture of approximately equal parts of natural rubber and GR-S rubber (butadiene-styrene copolymer), 15 parts of coal tar oils, 3.2 parts of water and 17.8 parts of pulverized substantially petroleum hydrocarbon-insoluble pine wood resin. This mixture was placed in the pans of a conventional pan reclaiming apparatus, and the pans were then placed in the reclaimer. Live steam under pressure was introduced into the reclaimer until the temperature was raised to 425° F. (250 p. s. i. g.) and the injection of live steam was continued for about 16 hours. The steam was then shut off and the charge was removed from the reclaimer in the form of cakes of fused "shoddy." The cakes of shoddy were then milled on a two-roll mill, strained through a metal strainer to remove extraneous material, e. g., tramp metal, etc., and finally sheeted to slab form. The reclaimed rubber was found to be substantially devulcanized.

EXAMPLE 1A

The reclaimed rubber of Example 1, which analyzed 37% rubber hydrocarbon, was compounded in the Rubber Reclaimers' Association Official Test Formula as follows:

| | Parts |
|---|---|
| Reclaimed rubber hydrocarbon | 100 |
| Zinc oxide | 5 |
| Hydrogenated fish oil beads | 2 |
| Sulfur | 3 |
| Mercaptobenzothiazole | 0.5 |
| Diphenylguanidine | 0.2 |

When portions of the formula were cured in the prescribed manner, the cured piece resulting from the reclaim of Example 1 was found to be substantially harder, more rigid, and smoother than an identical cured piece produced from a reclaimed rubber processed exactly as in Example 1 except with the omission of the substantially petroleum hydrocarbon-insoluble pine wood resin. The increases in hardness and rigidity are demonstrated by the following data:

| Cure, Min. 287° F. | Reclaim Without Resin | Reclaim of Example 1 |
|---|---|---|
| Modulus at 200% Elong., p. s. i.: | | |
| 15 | 230 | 340 |
| 20 | 225 | 390 |
| 25 | 250 | 470 |
| 30 | 250 | 490 |
| 45 | | 570 |
| 60 | | 580 |
| Tensile Strength, p. s. i.: | | |
| 15 | 450 | 380 |
| 20 | 490 | 430 |
| 25 | 520 | 520 |
| 30 | 530 | 550 |
| 45 | | 590 |
| 60 | | 630 |
| Elong. at Break, percent: | | |
| 15 | 410 | 290 |
| 20 | 410 | 280 |
| 25 | 400 | 300 |
| 30 | 400 | 310 |
| 45 | | 280 |
| 60 | | 280 |
| Shore $A_2$ Hardness: | | |
| 15 | 35 | 47 |
| 20 | 37 | 54 |
| 25 | 38 | 67 |
| 30 | 40 | 70 |
| 45 | | 71 |
| 60 | | 72 |
| Bashore Resilience, percent: | | |
| 15 | 23 | 14 |
| 20 | 21 | 14 |
| 25 | 22 | 15 |
| 30 | 23 | 14 |
| 45 | | 15 |
| 60 | | 14 |

EXAMPLE 1B

In this example, commercial automobile radiator hoses were extruded from compositions composed of reclaimed rubber and carbon black as the basic ingredients. In one composition, the rubber content comprised a blend of 50% of a commercial tube reclaim made without the incorporation of substantially petroleum hydrocarbon-insoluble pine wood resin and 50% of the reclaim of Example 1. In the other composition, the entire rubber content consisted of the commercial reclaim. The accelerator, plasticizer and lubricant content of each composition was the same.

A comparison of the two pieces of hose showed that the one prepared from the composition containing the reclaimed rubber of Example 1 had an unusually smooth surface that was relatively free from pin holes and blisters whereas the hose produced from the reclaim that contained no substantially petroleum hydrocarbon-insoluble pine wood resin contained numerous pin holes and blisters and, by comparison, had an unattractive surface. It is further to be noted that the composition containing the reclaimed rubber of Example 1 was extruded more easily in the preparation of the rubber hose.

The following data show also that the hose produced from the reclaim of Example 1 possessed superior resistance to antifreeze solutions and motor oil:

| | Commercial Reclaim | Commercial Reclaim Blended with Reclaim of Example 1 |
|---|---|---|
| Mooney Visc. ML-4 Min. at 212° F | 37.5 | 38 |
| Antifreeze Swell [1]: Average, All Cures Percent Volume Increase | 2.4 | 1.5 |
| Antifreeze Hardness [1]: Retention, Percent of Original Hardness | 70 | 78 |
| Motor Oil Swell [2] (Esso Extra No. 1): Percent Volume Increase | 26 | 24 |

[1] Immersed in equal parts by weight of water, isopropyl alcohol, and ethylene glycol. Heated at 158° F. for 1 week. ASTM D741-49T.
[2] Immersed in oil for 3 days at 158° F. ASTM D741-49T.

EXAMPLE 2

The procedure of Example 1 was followed except that the substantially petroleum hydrocarbon-insoluble pine wood resin utilized was modified by reaction with 1.5% of hexamethylene-tetramine, based on the weight of resin, according to the method described in U. S. Patent No. 2,260,187. The resulting reclaimed rubber was processed as in Example 1A and was found to result in a cured rubber article with approximately the same properties as that made from the reclaimed rubber of Example 1.

EXAMPLE 3

The procedure of Example 1 was repeated except that there was added 3% by weight of lime, based on the weight of substantially petroleum hydrocarbon-insoluble pine wood resin, to the charge to the reclaimer. The resulting reclaimed rubber was processed as in Example 1A and was found to result in a cured rubber article with approximately the same properties as that made from the reclaimed rubber of Example 1.

EXAMPLE 4

The procedure of Example 1 was followed in reclaiming ground whole tire scrap using varied amounts of substantially petroleum hydrocarbon-insoluble pine wood resin. The reclaimed rubber was next compounded according to the Rubber Reclaimers' Association Official Test Formula and then cured at 287° F. The following data shows the effect of increasing amounts of the pine wood resin on the shore hardness of the cured rubber:

*Shore hardness values*

| Cure Time (Minutes) | Percent Pine Wood Resin Based on Rubber | | | |
|---|---|---|---|---|
| | 0 | 7 | 10 | 15 |
| 10 | 52 | 54 | 58 | 65 |
| 15 | 56 | 57 | 61 | 70 |
| 20 | 57 | 58 | 63 | 72 |
| 25 | 59 | 60 | 65 | 75 |
| 30 | 59 | 61 | 66 | 74 |
| 45 | 60 | 62 | 67 | 76 |

The resin used in accordance with the present invention may be defined as the substantially petroleum hydrocarbon-insoluble pine wood resin prepared, for example, in accordance with the processes of U. S. patents to Hall, Nos. 2,193,026 and 2,221,540. This material, which is characterized herein by the term "substantially petroleum hydrocarbon-insoluble pine wood resin," is the resinous material which may be prepared from pine wood, preferably aged pine wood, as follows: The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present composition. Extraction of this mixture with a petroleum hydrocarbon such as, for example, gasoline, dissolves and removes the rosin. After separation of the rosin, high in abietic acid, a resinous residue remains which is low in abietic acid. Alternatively, the material obtained on evaporation of the coal tar hydrocarbon extract may be dissolved in a mixture of furfural and a petroleum hydrocarbon such as gasoline, and the two layers which form separated, in which case the substantially petroleum hydrocarbon-insoluble resin is found dissolved in the furfural phase from which it may be obtained by evaporation of the furfural. Other methods of isolating the desired petroleum hydrocarbon-insoluble pine wood resin may be employed, if desired. This resin, used in accordance with the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha- and toluol-insoluble material, depending upon the details of the extraction processes utilized. This resin will meet or nearly meet the following specifications, namely, substantial insolubility in petroleum hydrocarbons, substantially complete solubility in alcohol, a methoxy content from about 3% to about 7.5% (usually from about 4% to about 6%), an acid number in the range from about 90 to about 110, and a drop melting point in the range from about 95° C. to about 125° C. (203° F. to 257° F.). This resin is a solid material and comes into commerce in the pulverized or ground form. This resin is of a phenolic character and for the purposes of this invention its molecular weight is 450.

The conditions and manipulative procedures involved in the practice of the invention are outlined hereinabove and are the same as those known to the art in the practice of the pan process of reclaiming. It is preferred, however, that the use of alkaline compounds of sodium and potassium which are sometimes used in the pan process be avoided since such alkalies react with the substantially petroleum hydrocarbon-insoluble pine wood resin to form water-soluble salts and consequently the benefit derived from the pine wood resin is thereby reduced.

The examples have shown the invention applied to the reclaiming of a mixture of natural rubber and GR-S (butadiene-styrene copolymer). The process of the invention may be applied, however, to natural rubber alone or to GR-S alone with the same beneficial results, as well as to other synthetic rubber-like polymers known as "butalastics" [Marchionna, Butalastic Polymers, Reinhold (1947)] such as those prepared by polymerizing diolefins, halogenated derivatives of diolefins or other substituted diolefins or by copolymerizing diolefins with other compounds containing a vinyl group such as acrylic acid ester and acrylic acid nitrile. More specifically, the rubberlike polymers may be those obtained by polymerizing any conjugated diolefin, such as butadiene hydrocarbons and derivatives such as isoprene, dimethyl butadiene and chloroprene, or by copolymerizing isoprene and styrene or isoprene and acrylonitrile. The process of the invention is particularly applicable to GR-S, both hot and cold rubbers, and natural rubber.

Any of the usual reclaiming aids that are conventionally employed in the pan process of reclaiming can also be utilized in the process of the invention. Such aids include various reclaiming oils, for example, such as petroleum base oils, coal tar oils, paraffinic oils, naphtha, terpenes, and the like.

The reclaimed rubber produced by the process of the invention finds a variety of uses. As illustrative, it is useful in the manufacture of garden and radiator hoses, wire covering, floor mats and similar articles which benefit from an attractive surface or from increased hardness. In the manufacture of such articles, the reclaimed rubber can be processed in the same manner as other reclaimed rubbers are processed. In some instances, however, it may be desirable to employ relatively larger amounts of sulfur in order to achieve a complete cure in a normal curing cycle since the reclaimed rubber produced in the process of the invention has been found to be substantially slower curing than reclaimed rubbers that contain no substantially petroleum hydrocarbon-insoluble pine wood resin. Selection of suitable sulfur and accelerator content in any given instance is within the skill of the art.

What we claim and desire to protect by Letters Patent is:

1. In the pan process of reclaiming a rubber wherein a ground rubber scrap admixed with reclaiming oils is subjected to the reaction of live steam under pressure, the improvement which comprises adding to said scrap from 1 to 49% by weight of substantially petroleum hydrocarbon-insoluble pine wood resin based on the weight of scrap.

2. In the pan process of reclaiming a rubber wherein a ground rubber scrap admixed with reclaiming oils is subjected to the action of live steam under pressure, the improvement which comprises adding to said scrap from 1 to 49% by weight of formaldehyde-modified substantially petroleum hydrocarbon-insoluble pine wood resin based on the weight of scrap.

3. In the pan process of reclaiming a rubber wherein a ground rubber scrap admixed with reclaiming oils is subjected to the action of live steam under pressure, the improvement which comprises adding to said scrap from 1 to 49% by weight of lime-modified substantially petroleum hydrocarbon-insoluble pine wood resin based on the weight of scrap.

4. In the pan process of reclaiming a rubber wherein a ground rubber scrap admixed with reclaiming oils is subjected to the action of live steam under pressure, the improvement which comprises adding to said scrap from 1 to 49%, based on the weight of scrap, of a material selected from the group consisting of formaldehyde-modified, lime-modified and unmodified substantially petroleum hydrocarbon-insoluble pine wood resin.

5. The process of claim 4 in which the ground rubber scrap is natural rubber scrap.

6. The process of claim 4 in which the ground rubber scrap is butadiene—styrene copolymer scrap.

References Cited in the file of this patent
UNITED STATES PATENTS

| | | |
|---|---|---|
| 1,680,862 | Cude | Aug. 14, 1928 |
| 1,680,915 | Rose | Aug. 14, 1928 |
| 2,017,866 | Morton | Oct. 22, 1935 |
| 2,260,187 | Miller | Oct. 21, 1941 |
| 2,653,915 | Elgin et al. | Sept. 29, 1953 |

OTHER REFERENCES

Naval Stores and the Compounding of Synthetic Rubber, pp. 4, 6–8, Hercules Powder Co., Wilmington, Delaware, printed, July 1943.